United States Patent Office 3,748,164
Patented July 24, 1973

3,748,164
NOVEL PIGMENTATION METHOD FOR ORGANIC PIGMENTS
Takashi Akamatsu, Ashiya, and Yukio Kuwahara, Osaka, Japan, assignors to Sumitomo Chemical Company, Limited, Osaka, Japan
No Drawing. Filed June 17, 1971, Ser. No. 154,175
Claims priority, application Japan, June 23, 1970, 45/55,446; July 27, 1970, 45/65,959
Int. Cl. C09c
U.S. Cl. 106—288 Q         16 Claims

ABSTRACT OF THE DISCLOSURE

A method for producing a pigment by conditioning a crude organic pigment, which comprises grinding a mixture of a crude organic pigment and an aminoplast as a tackifying agent in the presence of an inorganic or organic salt as a grinding agent in a double-arm dispersion mixer, in the absence or presence of at least one additive selected from the group consisting of water, alcohols, aliphatic hydrocarbons, aliphatic halohydrocarbons, aromatic hydrocarbons, aromatic halohydrocarbons, surface active agents and solid resins.

---

This invention relates to a novel method for producing a pigment by conditioning crude organic pigments.

A crude pigment has been transformed into a pigmentary state by (1) acid pasting method, (2) acid slurry method, or (3) ball milling method. Further, it is disclosed in U.S. Pat. 2,982,666 that the crude pigment may be transformed into a pigmentary state by means of a mixer having double mixing blades of the so-called "sigma" type.

In comparison with conventional methods (1) to (3) mentioned above, the method disclosed in the U.S. Pat. 2,982,666 has the following advantages: (1) Large amounts of sulfuric acid are unnecessary and, accordingly, no facility for treating waste water is necessary. (2) The grinding period is shorter and production is larger than that in the ball mill method, resulting in an increase in productivity. (3) The organic pigments obtained are softer in texture, brighter in shade, more easily dispersible, and have characteristic properties desirable for use in coloring printing inks or paints, and in coloring synthetic resins.

On the other hand, it is known that the tackifying agent used in the method in which the mixer having double mixing blades is used requires severe conditions on its velocity, boiling point and solubility in water, and therefore it is considered that there are no suitable tackifying agent other than those disclosed in said U.S. Pat. 2,982,666.

The present inventors have investigated on the tackifying agent to improve the method of said U.S. Pat. 2,982,666 and have found that, when an aminoplast is used as the tackifying agent, pigments having more excellent pigmentary properties may be given with commercial advantages and higher productivity, compared with those of said U.S. Pat. 2,982,666.

Thus, the present invention is to provide a method for producing a pigment by conditioning a crude organic pigment, which comprises grinding a mixture of a crude organic pigment and an aminoplast as a tackifying agent in the presence of an inorganic or organic salt as a grinding agent in a double-arm dispersion mixer, in the absence or presence of at least one additive selected from the group consisting of water, alcohols, aliphatic hydrocarbons, aliphatic halohydrocarbons, aromatic hydrocarbons, aromatic halohydrocrabons, surface active agents and solid resins.

The practice of the present process will be explained below in more detail.

The crude organic pigments for use in this invention include metal-free phthalocyanines, metal phthalocyanines (metals such as copper, nickel, cobalt, iron, aluminum, magnesium, manganese, titanium, vanadium, and zinc); sulfo-, carboxy-, hydroxymethyl-, nitro-, allyl-, methylol-, aminomethyl-, carbomethyl-, and phospho-substituted derivatives of non-metal and metal phthalocyanines; various azo pigments including azo condensation pigments; and aromatic condensed ring pigments such as vat pigments, anthraquinone pigments, dioxazine pigments, quinacridone pigments, fluorubine pigments, naphthalene pigments, perylene pigments, isoindolinone pigments, thiachromone pigments, thioindigo pigments, quinophthalone pigments, pyrrocoline pigments, metal complex pigments, etc.

The aminoplasts for use in the present process as tackifying agents is at least one member selected from the group consisting of urea derivatives having the formula,

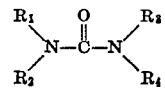

wherein $R_1$, $R_2$, $R_3$ and $R_4$ are hydrogen atoms or —$CH_2OR'$ groups in which $R'$ is hydrogen atom, a $C_1$-$C_6$ alkyl group, β-hydroxyethyl group, or methyleneamino group, having the formula, $$-NH-A-NH_2$$

wherein A is —$(CH_2)_n$— or —$(CH_2)_nNH(CH_2)_n$— in which $n$ is an integer of 1 to 6, except for the case where $R_1$, $R_2$, $R_3$ and $R_4$ are hydrogen atoms simultaneously, thiourea derivatives having the formula,

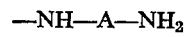

wherein $R_1$, $R_2$, $R_3$ and $R_4$ are the same as defined above, guanidine derivatives having the formula,

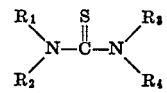

wherein $R_1$, $R_2$, $R_3$ and $R_4$ are the same as defined above, dicyandiamide derivatives having the formula,

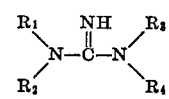

wherein $R_1$ and $R_2$ are the same as defined above, melamine derivatives having the formula,

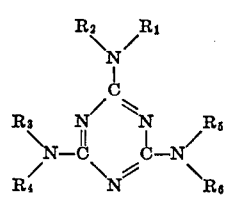

wherein $R_1$, $R_2$, $R_3$ and $R_4$ are as defined above, and $R_5$ and $R_6$ are hydrogen atoms or —$CH_2OR'$ groups in which $R'$ is hydrogen atom or a $C_1$-$C_6$ alkyl group, β-hydroxyethyl group, or methyleneamino group except for the case where $R_5$ and $R_6$ are simultaneously hydrogen atom, triazone derivatives having the formula,

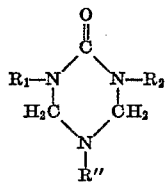

wherein $R_1$ and $R_2$ are as defined above, and $R''$ is a $C_1$-$C_6$ alkyl group or β-hydroxyethyl group, imidazolidone derivatives having the formula,

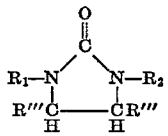

wherein $R_1$ and $R_2$ are as defined above, and $R'''$ is hydrogen atom, hydroxyl group, or a $C_1$-$C_6$ alkoxy group, cyclic urea derivatives having the formula,

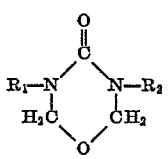

wherein $R_1$ and $R_2$ are as defined above, carbamate derivatives having the formula,

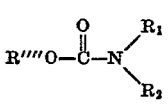

wherein $R_1$ and $R_2$ are as defined above and $R''''$ is hydrogen atom or a $C_1$-$C_6$ alkyl group, trimethyleneurea derivatives having the formula,

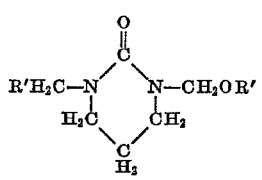

wherein $R'$ is as defined above, and ethylenethiourea derivatives having the formula,

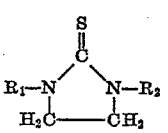

wherein $R_1$ and $R_2$ are as defined above.

The aminoplasts for use in this invention as tackifying agents are those which are widely used in the form of aqueous solutions, e.g. 30 to 90%, preferably, 50 to 80% aqueous solutions, as adhesives or in paper treatment and textile finishing. In the method of this invention, the aminoplast is used in an amount of 0.005 to 3.0 parts by weight, preferably 0.025 to 0.75 part by weight per 1 part by weight of the crude pigment to be ground.

The inorganic salts to be used in the present invention as grinding agents to improve the efficiency of grind include preferably water-soluble inorganic salts such as sodium sulfate, sodium chloride, calcium chloride, calcium carbonate, sodium carbonate; and organic salts such as sodium acetate. The amount to be used is 3 to 10 times, preferably 4 to 7 times the weight of the crude pigment.

Additives may be used, if desired, to improve grinding effect of the mixture to be ground and to impart characteristic properties to the resulting pigments.

As the additives, there is used at least one member of water, alcohols, aliphatic hydrocarbons, aliphatic halohydrocarbons, aromatic hydrocarbons, aromatic halohydrocarbons, surface active agents, solid resins, and rosins. Examples of the alcohols include benzyl alcohol, phenethyl alcohol, n-propyl alcohol, isopropyl alcohol, allyl alcohol, n-butyl alcohol, isobutyl alcohol, cyclohexanol, methyl cellosolve, ethyl cellosolve, diethylene glycol monomethyl ether, ethylene glycol, glycerol, and diethylene glycol. The amount of the alcohol added to the mixture to be ground is 0.01 to 0.5 part by weight, preferably 0.05 to 0.3 part by weight per 1 part by weight of said salt used as a grinding aid.

Examples of hydrocarbons and halohydrocarbons, include aliphatic hydrocarbons and halohydrocarbons such as cyclohexane, cyclobutane, cyclooctane, n-hexane, n-heptane, n-octane, n-nonane, n-decane, n-undecane, n-dodecane, n-tetradecane, n-pentadecane, n-hexadecane, n-heptadecane, tetrachloromethane, tetrachloroethane, hexachloroethane, dichloroethylene, trichloroethylene, dibromoethylene, tribromoethylene, perchloroethylene ("Perclene"), etc.; and aromatic hydrocarbons and halohydrocarbons such as benzene, toluene, o-xylene, m-xylene, p-xylene, ethylbenzene, styrene, cumene, diphenyl, naphthalene, chlorobenzene, bromobenzene, o-chlorotoluene, o-dichlorobenzene, p-dichlorobenzene, trichlorobenzene, chloronaphthalene, bromonaphthalene, etc. The amount of these compounds to be added is 0.01 to 3.0 parts by weight, preferably 0.05 to 2.0 parts by weight per 1 part of the crude pigment to be ground.

Surface active agents and solid resins, are used in this invention also as additives. These additives not only act effectively in the kneading and grinding step, but also are absorbed on pigment particles in the succeeding step of removing salts in water or a dilute acid solution, and impart characteristic properties to the resulting pigments so that the finished products for use in paints and in coloring synthetic resins may have proper and favorable properties for their destined uses. The effective surface active agents for use in this invention include cationic, nonionic, and anionic types, most preferred being cationic and nonionic types. Effective cationic surface active agents include hardened beef tallow-amine acetate, hardened beef tallow-propylenediamine diacetate, laurylamine acetate, and quaternary ammonium salts such as, for example, lauryltrimethyl ammonium chloride, stearyltrimethyl ammonium chloride, distearyldimethyl ammonium chloride, alkylbenzyldimethyl ammonium chloride, alkylamidomethyl pyridinium chloride, laurylpicolinium chloride, and polyoxyethylenealkylamine. Effective nonionic surface active agents include polyoxyethylene alkyl ethers, polyoxyethylene alkyl phenyl ethers, aliphatic esters of sorbitan, polyoxyethylene sorbitan aliphatic esters, polyoxyethylene acyl esters, oxyethylene-oxypropylene block polymers, aliphatic monoglycerides, etc. The amount of surface active agents to be added is 0.005 to 0.5 part by weight, preferably 0.01 to 0.3 part by weight per 1 part by weight of crude pigment to be ground.

Effective solid resins include rosins, chemically modified rosins, and rosin salts such as, for example, gum rosin, wood rosin, tall oil rosin, hydrogenated rosin, polymerized rosin, rosin alcohol, phenol-modified rosin, maleic acid-modified rosin, calcium salt of rosin, barium salt of rosin, and other natural or synthetic solid resins. The amount of these resins to be added is 0.005 to 0.5 part by weight, preferably 0.01 to 0.3 part by weight per 1 part by weight of crude pigments to be ground.

Water may be added, if necessary, together with other above-mentioned additives, in an amount of 0.01 to 0.5 part by weight, preferably 0.05 to 0.3 part by weight per 1 part of said salts used as grinding agents.

A mixture of the crude pigment, the aminoplast and the inorganic or organic salt is ground in the absence or presence of the additives in a double-arm dispersion mixer, at 10° to 160° C., preferably 20° to 60° C., for 0.5 to 30 hours, preferably 4 to 10 hours, while maintaining the mixture in a state of sticky, compacted and sand-like particles, said state being neither pasty nor powdery.

Equipments suitable for kneading and grinding the crude pigments according to this invention include double-arm dispersion mixers which may be operated under increased pressure or at ordinary pressure. There may be used "Banbury mixer," "Baker Perkins dispersion mixer," and "MS Intensive pressure kneader, Type D" (Moriyama Seisakusho), "Double-arm intensive kneader, Type G" (Moriyama Seisakusho), "Universal mixer" (Baker Perkins), and "Intensive kneader" (Inoue Seisakusho).

The effects of the invention are disclosed below in more detail.

Since the crude pigments and auxiliary grinding agents used in this invention are in the form of powder, a large amount of powder is required in grinding said crude pigments to transform into useful pigments. To overcome such a difficulty, it is advantageous to maintain during the grinding operation the mixture in a grinding apparatus in a state of sticky, compacted, sand-like particles, the state being neither pasty nor powdery. The aminoplast for use in this invention satisfies the required conditions for maintaining such a state. The said aminoplast plays an important role as a tackifying agent in bringing about adhesion of the auxiliary grinding agent, that is, an inorganic or organic salt, onto the organic pigment to improve the grinding efficiency and consequently to yield the desired pigment in shorter period of time. An additional advantage of the aminoplast as a tackifying agent is its excellent solubility in water, which enables its easy removal together with the grinding agent on pouring the ground mass into water from the double-arm dispersion mixer after completion of the grinding, and accordingly the pigment obtained is high in purity.

The additives added in grinding the crude pigments are effective in imparting to the resulting pigments characteristic properties desirable for respective uses. For example, hydrocarbons control the crystalline form of the pigment to make the shade more brilliant, and the resulting pigments are useful in printing inks, paints and for coloring synthetic resins. Water and alcohols control the crystal from of certain pigments, for example, an α-form copper phthalocyanine, and the resulting pigment is useful in coloring synthetic resins. Solid resins form an intimate and uniform mixture with the crude pigment on grinding in the presence of the tackifying agent and other additives, resulting in a composition comprising an intimate mixture of the pigment and resins, in the succeeding step of removing the salts in water or an aqueous acid solution the composition being useful in coloring synthetic resins and paints.

The pigment suitable for use in a printing ink, which is obtained by the process of this invention, is excellent in tinctorial strength. For example, compared with a β-form copper phthalocyanine obtained by the ball milling method, the pigment obtained by the present method is confirmed to be more brighter in shade and superior in tinctorial strength by 20% in a test performed according to the Hoover Muller method.

On the other hand, by incorporating in a flexible polyvinyl chloride composition, the pigment for coloring synthetic resins, which is obtained according to this invention, is compared with the pigment obtained by the ball milling method, and it is confirmed that the former pigment is superior in transparency of the transparent composition, and in fastness to both light and migration. Among the organic pigments obtained according to this invention, for example, a red pigment of the azo condensation type, which is, for example, obtained in Example 15, is compared with the pigment of the same type, which is obtained by the ball milling method, by incorporating both pigments in a flexible polyvinyl chloride composition. It is confirmed that the pigment obtained according to this invention, for example, in Example 15 is an excellent pigment for coloring synthetic resins.

The characteristic aspects of the pigment for use in paints are described below.

A crude copper phthalocyanine derivative, as an example of crude pigments, is treated according to the present invention, to obtain advantageously a phthalocyanine pigment having desirable properties for use in paints, being non-crystallizable, non-flocculable, and easily dispersible. The pigment shows no crystal growth when treated in an organic solvent of aromatic type. Further, the pigment obtained by the present method is of low viscosity and shows no structural viscosity, pointing to the excellent characteristics of the pigment.

This invention is illustrated below by reference to examples, which are nonlimitative. In examples, all parts and percentages are by weight unless otherwise specified.

EXAMPLE 1

Into a double-arm dispersion mixer having a capacity of 4,000 parts by volume, were charged 250 parts of crude β-form copper phthalocyanine (97% pure) and 1,750 parts of sodium sulfate. To the mixer, two or three minutes after the start of revolution, was added gradually 25 parts of perchloroethylene, then 60 parts of N-methylolmelamine ("Sumitex Resin M-3," trademark of Sumitomo Chemical Co., Ltd.; 80% solids), and then gradually 300 parts of isopropyl alcohol. While being maintained in the state of sticky, compacted, and sand-like particles, a state which was neither pasty nor powdery, the contents of the mixer was ground at 40° to 60° C. for 8 hours, and thereafter the ground mass was drawn out of the mixer into a beaker. The ground mass in the beaker was admixed with 8,000 parts of 3% hydrochloric acid, stirred at 80° to 90° C. for one hour, collected by filtration, washed with water, and dried to obtain 242 parts of a pigment for printing inks, highly bright greenish blue in color and of excellent tinctorial strength.

EXAMPLE 2

Into a double-arm dispersion mixer having a capacity of 4,000 parts by volume, were charged 250 parts of crude β-form copper phthalocyanine (97% pure) and 1,750 parts of sodium chloride. To the mixer, after two or three minutes from the start of revolution, were added successively 25 parts of perchloroethylene and 100 parts of an aminoplast ("Sumitex Resin 810," trademark of Sumitomo Chemical Co., Ltd.; 55% solids), and then 12.5 parts of polyoxyethylene acyl ester ("Emanone 3115," trademark of Kao-Atlas Co.) dissolved in 175 parts of isopropyl alcohol. After being ground at 30° to 50° C. for 6 hours, the contents of the mixer was discharged and treated in a manner similar to that in Example 1 to obtain 253 parts of a blue pigment with excellent tinctorial power, extremely bright blue with green shade in color, which is useful for coloring synthetic resins.

EXAMPLE 3

Into a double-arm dispersion mixer having a capacity of 4,000 parts by volume, were charged 250 parts of crude β-form copper phthalocyanine (97% pure) and 1,700 parts of sodium chloride. To the mixer, 2 or 3 minutes after the start of revolution, were added successively 25 parts of trichloroethylene, 100 parts of an aminoplast ("Sumitex Resin 901," trademark of Sumitomo Chemical Co., Ltd.; 50% solids), 20 parts of polyoxyethylene acyl ester ("Emanone 3299," trademark of Kao-Atlas Co.) dissolved in 175 parts of isopropyl alcohol, and 12.5 parts of "Shiragiku-brand rosin" (trademark of Arakawa Rinsan Co.). After having been ground at 30° to 50° C. for 8 hours, the ground mass was discharged and treated in the same manner as in Example 1, to obtain 261 parts of a green-shade blue pigment having an excellent tinctorial strength and which is useful for coloring synthetic resins.

EXAMPLE 4

Procedure of Example 2 was repeated, except that 400 parts of crude copper phthalocyanine (60% pure) was used instead of the crude β-form copper phthalocyanine (97% pure) to obtain 249 parts of highly bright green-shade blue pigment having an excellent tinctorial strength, which is useful for use in synthetic resins.

EXAMPLE 5

Into a double-arm dispersion mixer having a capacity of 4,000 parts by volume, were charged 250 parts of crude partially chlorinated copper phthalocyanine (chlorine content, 6%; phthalocyanine content, 90%), 1,000 parts of sodium chloride, 100 parts of sodium acetate, and 12.5 parts of polyoxyethylenealkylphenol ("Emulgen 915," trademark of Kao-Atlas Co.). To the mixer, 2 or 3 minutes after the start of revolution, was added 175 parts of an aminoplast ("Sumitex Resin 810," trademark of Sumitomo Chemical Co.; 55% solids) and then 60 parts of isobutyl alcohol to maintain stickiness of the contents. After having been ground at 70° to 90° C. for 8 hours, the contents was discharged and the resulting ground mass was treated in the same manner as in Example 1 to obtain 231 parts of a pigment having an excellent tinctorial strength and an excellent thermal stability, which is useful for coloring synthetic resins.

EXAMPLE 6

Into a double-arm dispersion mixer having a capacity of 4,000 parts by volume, were charged 400 parts of crude polychlorinated copper phthalocyanine (chlorine content, 47.2%), 1,200 parts of sodium chloride, and 400 parts of sodium sulfate. To the mixer, 2 or 3 minutes after starting revolution, were added gradually and successively 40 parts of perchloroethylene and 250 parts of isobutyl alcohol. After having been ground at 40° to 60° C. for 6 hours, the ground mass was discharged and treated in the same manner as in Example 1 to obtain 392 parts of a highly bright yellow-shade green pigment which is useful in printing inks, paints, and for coloring synthetic resins.

EXAMPLE 7

The grinding procedure disclosed in Example 1 was repeated using the same recipe except that metal-free phthalocyanine was used instead of the crude copper phthalocyanine. After-treatment was carried out in the same manner as in Example 1 to obtain 243 parts of a bright green-shade blue pigment which is especially useful in printing inks and for coloring synthetic resins.

EXAMPLE 8

The grinding and after-treating procedure of Example 6 was repeated using crude polychlorinated metal-free phthalocyanine (chlorine content, 52%; phthalocyanine content, 95%) instead of the crude polychlorinated copper phthalocyanine, to obtain 390 parts of a bright green pigment which is useful for coloring synthetic resins.

EXAMPLE 9

The grinding and after-treating procedure of Example 1 was repeated using 350 parts of crude zinc phthalocyanine (70% pure) instead of the crude copper phthalocyanine to obtain 237 parts of a bright blue pigment.

EXAMPLE 10

Into a double-arm dispersion mixer having a capacity of 1,000 parts by volume, were charged 600 parts of sodium sulfate and 120 parts of a crude red pigment represented by the structural formula,

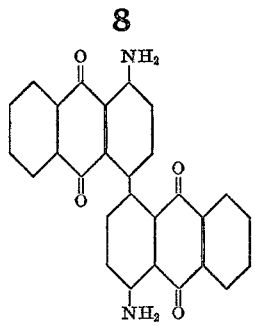

To the mixer which had been started to run, were added gradually 60 parts of an aminoplast of the N-methylolurontype ("Sumitex Resin 810," trademark of Sumitomo Chemical Co., Ltd.; 55% solids), then 20 parts of isobutyl alcohol, and thereafter gradually 20 parts of xylene. The tinctorial strength of the ground pigment had been sufficiently developed after five hours of kneading and grinding, when the contents of the mixer was discharged and treated in the same manner as in Example 1 to obtain 113 parts of a remarkably bright red pigment having a high tinctorial strength.

EXAMPLE 11

Into a double-arm dispersion mixer having a capacity of 1,000 parts by volume, were charged 600 parts of sodium sulfate and 120 parts of a crude yellow pigment represented by the structural formula,

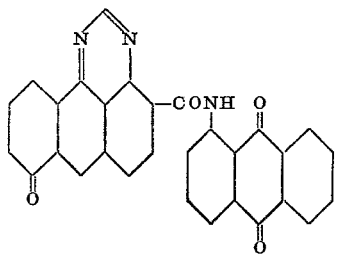

To the mixer which had been started to run, were added gradually and successively 60 parts of an aminoplast of the N-methyloltriazone-type cyclic urea derivative ("Sumitex Resin 850," trademark of Sumitomo Chemical Co., Ltd.; 50% solids), 24 parts of toluene, and 24 parts of water. After having been kneaded and ground at 90° to 110° C. for 10 hours, the ground mass was treated in the same manner as in Example 1 to obtain 109 parts of a bright yellow pigment having a high tinctorial strength.

EXAMPLE 12

Into a double-arm dispersion mixer having a capacity of 1,000 parts by volume, were charged 600 parts of sodium chloride and 120 parts of a crude blue pigment represented by the structural formula,

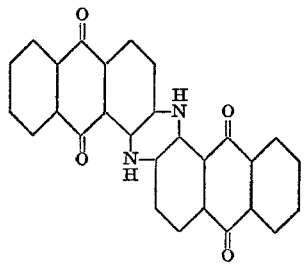

To the mixer which had been started to run, were added gradually and successively 50 parts of an aminoplast of the methylolmelamine-type ("Sumitex Resin M–3," trademark of Sumitomo Chemical Co., Ltd.; 80% solids), 30 parts of water, and 60 parts of perchloroethylene. After having been ground at 40° to 60° C. for 10 hours, the ground mass was treated in the same manner as in Example 1 to obtain 105 parts of a bright blue pigment having a high tinctorial strength.

EXAMPLE 13

Into a double-arm dispersion mixer having a capacity of 1,000 parts by volume, were charged 600 parts of sodium chloride and 120 parts of a crude violet pigment represented by the structural formula,

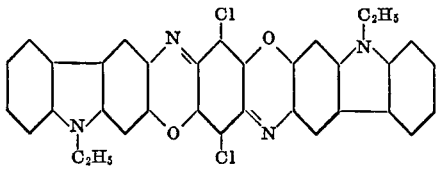

To the mixer which had been started to run, were added gradually and successively 50 parts of an aminoplast of the ethyleneurea-type ("Sumitex Resin 901," trademark of Sumitomo Chemical Co., Ltd.; 50% solids), 12 parts of naphthalene, 24 parts of perchloroethylene, and 30 parts of isobutyl alcohol. After having been ground at 60° to 80° C. for 8 hours in a manner similar to that in Example 1, the ground mass was treated in a manner similar to that in Example 1 to obtain 112 parts of a bright violet pigment having a high tinctorial strength.

EXAMPLE 14

Into a double-arm dispersion mixer having a capacity of 1,000 parts by volume, were charged 600 parts of sodium sulfate and 120 parts of a crude red pigment represented by the structural formula,

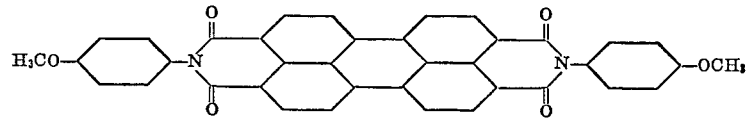

To the mixer which had been started to run, were added gradually and successively 60 parts of an aminoplast of the N-methylolurea-type ("Sumitex Resin 280," trademark of Sumitomo Chemical Co., Ltd.; 70% solids), 30 parts of ethylene glycol, and 12 parts of xylene. After having been ground at 50° to 70° C. for 7 hours in the same manner as in Example 1, the ground mass was treated in a manner similar to that in Example 1 to obtain 106 parts of a bright red pigment having a high tinctorial strength.

EXAMPLE 15

Into a double-arm dispersion mixer having a capacity of 4,000 parts by volume, were charged 1,500 parts of sodium chloride, 60 parts of sodium acetate, and 300 parts of a crude azoic red pigment represented by the structural formula,

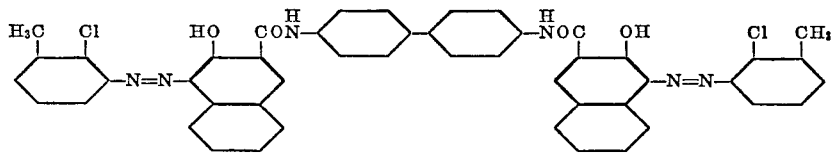

Into the mixer which had been started to run, were added gradually 60 parts of an aminoplast of the N-methyloluron-type ("Sumitex Resin 810," trademark of Sumitomo Chemical Co., Ltd.; 55% solids) and then gradually 90 parts of isobutyl alcohol. After having been ground at 40° to 50° C. for 4 to 8 hours to develop sufficient tinctorial strength, the ground mass was discharged and treated in a manner similar to that in Example 1 to obtain 287 parts of a bright red pigment having a high tinctorial strength, which is useful in paints and for coloring synthetic resins.

EXAMPLE 16

Into a double-arm dispersion mixer having a capacity of 4,000 parts by volume, was charged 300 parts of crude β-form copper phthalocyanine. Into the mixer which had been started to run, was added dropwise 300 parts of concentrated sulfuric acid (98%), and the mixture was kneaded for 1 to 2 hours to form copper phthalocyanine sulfate, to which was added 328 parts of sodium carbonate (97%). The mixture was kneaded for 6 to 8 hours, to which was then added dropwise 60 parts of water to slowly decompose the sulfuric acid salt of copper phthalocyanine into α-form copper phthalocyanine. To the resulting α-form copper phthalocyanine, was added 1,400 parts of sodium sulfate, and then slowly 300 parts of an aminoplast of the N-methyloluron-type ("Sumitex Resin 810," trademark of Sumitomo Chemical Co., Ltd.). After 5 hours of kneading when griding was completed, the contents was discharged from the mixer and treated in a manner similar to that in Example 1 to obtain 283 parts of a fine red-shade blue pigment of α-form copper phthalocyanine, which is useful for coloring synthetic resins.

EXAMPLE 17

Into a double-arm dispersion mixer of 4,000 parts by volume, were charged 250 parts of crude α-form copper phthalocyanine (96% pure) and 1,750 parts of sodium sulfate. Into the mixer which had been started to run, was added gradually 425 parts of an aminoplast ("Sumitex Resin 901," trademark of Sumitomo Chemical Co., Ltd.; 50% solids), and the mixture was kneaded and ground at 30° to 40° C. for 5 hours. The ground mass was discharged and treated in a manner similar to that in Example 1 to obtain 238 parts of a red-shade fine blue pigment of α-form copper phthalocyanine, which is useful in paints and for coloring synthetic resins.

EXAMPLE 18

Into a double-arm dispersion mixer having 4,000 parts by volume, were charged 250 parts of crude α-form copper phthalocyanine (96% pure) and 1,750 parts of sodium sulfate. Into the mixer which had been started to run, was gradually added 20 parts of polyoxyethylene acyl ester ("Emanone 3299," trademark of Kao-Atlas Co.,), then gradually 425 parts of an aminoplast ("Sumitex Resin 810," trademark of Sumitomo Chemical Co., Ltd.; 55% solids), and thereafter 50 parts of isopropyl alcohol. After having been kneaded and ground at 30° to 50° C. for 10 hours, the contents was discharged from the mixer, and treated in a manner similar to that in Example 1 to obtain 248 parts of a red-shade fine blue pigment of α-form copper phthalocyanine, which is excellent in hue and dispersibility for use in coloring synthetic resins.

EXAMPLE 19

Into a double-arm dispersion mixer having a capacity of 4,000 parts by volume, were charged 210 parts of crude partially chlorinated copper phthalocyanine (chlorine content, 6.8%), 90 parts of crude partially chlorinated sulfo-copper phthalocyanine (sulfur content, 1.54%; chlorine content, 3.5%), 9 parts of an oil-soluble pigment of the copper phthalocyanine type (copper phthalocyanine-disulfododecylamide), and 1,500 parts of sodium chloride. Into the mixer which had run for 2 or 3 minutes, were added successively 150 parts of an aminoplast of the N-methyloluron-type ("Sumitex Resin 810," trademark of Sumitomo Chemical Co., Ltd.; 55% solids) and 10 parts of alkylamidomethyl pyridinium chloride ("Softex KZ, trademark of Kao-Atlas Co.). After having been kneaded and ground at 30° to 50° C. for 6 hours, the contents was discharged from the mixer and treated in a manner similar to that in Example 1 to obtain 317 parts of a blue pigment which was suitable for use in paints.

The pigment thus obtained was made into a paint by mixing in a 1-liter ball mill with an alkyd resin varnish and a paint thinner. As was confirmed by viscosity measurement, said paint showed no structural viscosity. The light-colored paint, which was obtained by cutting said paint to 1/10 with a white paint, showed neither flocculation nor color separation and retained an excellent paintability after having been left standing for one month.

EXAMPLE 20

Into a double-arm dispersion mixer having a capacity of 4,000 parts by volume, were charged 210 parts of crude partially chlorinated copper phthalocyanine (chlorine content, 11.3%), 90 parts of crude carboxy-copper phthalocyanine, 9 parts of copper phthalocyanine disulfododecylamide, 6 parts of manganese phthalocyanine, and 1,500 parts of sodium chloride. Into the mixer, after two or three minutes from the start of running, were added successively 160 parts of N-methylolmelamine ("Sumitex Resin M-3," trademark of Sumitomo Chemical Co., Ltd.; 85% solids), 15 parts of perchloroethylene, 15 parts of lauryl picolinium chloride ("Position B," trademark of Kao-Atlas Co.), and 90 parts of isobutyl alcohol. After having been ground at 30° to 50° C. for 6 hours, the ground mass was discharged and treated in a manner similar to that in Example 1 to obtain 321 parts of a blue pigment suitable for use in paints.

EXAMPLE 21

Into a double-arm dispersion mixer having a capacity of 4,000 parts by volume, were charged 210 parts of crude partially chlorinated copper phthalocyanine (chlorine content, 6.8%), 90 parts of crude partially chlorinated sulfo-copper phthalocyanine (sulfur content, 0.8%; chlorine content, 3.4%), 6 parts of copper phthalocyanine tetrasulfoisohexylamide, 6 parts of zinc phthalocyanine, and 1,500 parts of sodium sulfate. Into the mixer, after 2 or 3 minutes from start of running, were added successively 160 parts of an aminoplast of the urea-type ("Sumitex Syrup 250," trademark of Sumitomo Chemical Co.., Ltd.; 80% solids), 10 parts of laurylpicolinium chloride, 5 parts of beef tallow propylene diamine ("Diamine TD," trademark of Kao-Atlas Co.), and 90 parts of isopropyl alcohol. After having been ground at 70° to 80° C., the ground mass was treated in a manner similar to that in Example 1 to obtain 320 parts of a blue pigment, which was useful in paints.

EXAMPLE 22

Into a double-arm dispersion mixer having a capacity of 4,000 parts by volume, were added 210 parts of crude partially chlorinated copper phthalocyanine (chlorine content, 3.6%), 90 parts of crude partially chlorinated sulfocopper phthalocyanine (sulfur content, 0.8%; chlorine content, 3.4%), 6 parts of aluminum phthalocyanine, 9 parts of copper phthalocyanine dicarboxyisohexylamide, and 1,500 parts of sodium sulfate. Into the mixer, after 2 or 3 minutes from start of running, were added successively, 15 parts of xylene, 15 parts of "Rosin Amine D," 15 parts of hydrogenated rosin (Arakawa Rinsan Co.), 160 parts of an aminoplast of N-methyloltriazone-type cyclic urea derivative (50% solids), and 90 parts of water. After having been ground at 50° to 60° C. for 6 hours, the ground mass was treated in a manner similar to that in Example 1 to obtain 305 parts of a blue pigment which was excellent for use in paints.

EXAMPLE 23

Into a double-arm dispersion mixer having a capacity of 4,000 parts by volume, were charged 280 parts of crude partially chlorinated copper phthalocyanine (chlorine content, 11.3%), 20 parts of copper phthalocyanine disulfobutoxyethylamide, 4.5 parts of tin phthalocyanine, 1,500 parts of sodium chloride, and 60 parts of anhydrous sodium acetate. Into the mixer, after 2 or 3 minutes from the start of running, were added successively 160 parts of an aminoplast of the N-methyloluron type, 10 parts of "Softex KZ" (trademark of Kao-Atlas Co.), 15 parts of rosin alcohol (manufactured by Arakawa Rinsan Co.), and 90 parts of isobutyl alcohol. After having been ground at 30° to 50° C. for 6 hours, the ground mass was treated in a manner similar to that in Example 1 to obtain a blue pigment which was excellent for use in paints.

EXAMPLE 24

Into a double-arm dispersion mixer having a capacity of 4,000 parts by volume, were charged 210 parts of crude partially chlorinated copper phthalocyanine (chlorine content, 6.8%), 90 parts of crude partially chlorinated sulfo-copper phthalocyanine (sulfur content, 1.54%; chlorine content, 3.5%), and 1,500 parts of sodium chloride. Into the mixer, after 2 or 3 minutes after the start of running, was added gradually 160 parts of an aminoplast of the N-methyloluron type ("Sumitex Resin 810," trademark of Sumitomo Chemical Co., Ltd.; 55% solids), and after 5 minutes gradually 90 parts of isobutyl alcohol. After having been ground at 30° to 50° C. for 6 hours to obtain 310 parts of a blue pigment which was excellent for use in paints.

What is claimed is:

1. A method for producing a pigment by conditioning a crude organic pigment, which comprises grinding a mixture of a crude organic pigment and an aminoplast as a tackifying agent in the presence of an inorganic or organic salt as a grinding agent in a double-arm dispersion mixer, in the absence or presence of at least one additive selected from the group consisting of water, alcohols, aliphatic hydrocarbons, aliphatic halohydrocarbons, aromatic hydrocarbons, aromatic halohydrocarbons, surface active agents and solid resins, wherein said aminoplast is at least one member selected from the group consisting of urea derivatives having the formula,

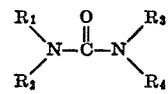

wherein $R_1$, $R_2$, $R_3$ and $R_4$ are hydrogen atoms or

groups in which R' is hydrogen atom, a $C_1$–$C_6$ alkyl group, β-hydroxyethyl group, or methyleneamino group, having the formula,

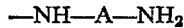

wherein A is —$(CH_2)_n$— or —$(CH_2)_n NH(CH_2)_n$— in which $n$ is an integer of 1 to 6, except for the case where $R_1$, $R_2$, $R_3$ and $R_4$ are hydrogen atoms simultaneously, thiourea derivatives having the formula,

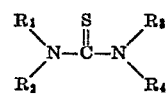

wherein $R_1$, $R_2$, $R_3$ and $R_4$ are the same as defined above, guanidine derivatives having the formula,

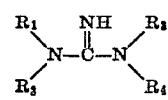

wherein $R_1$, $R_2$, $R_3$ and $R_4$ are the same as defined above, dicyandiamide derivatives having the formula,

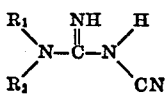

wherein $R_1$ and $R_2$ are the same as defined above, melamine derivatives having the formula,

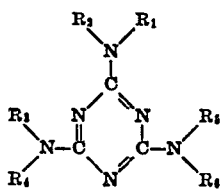

wherein $R_1$, $R_2$, $R_3$ and $R_4$ are as defined above, and $R_5$ and $R_6$ are hydrogen atoms or —$CH_2OR'$ groups in which $R'$ is hydrogen atom or a $C_1$–$C_6$ alkyl group, β-hydroxyethyl group, or methyleneamino group except for the case where $R_5$ and $R_6$ are simultaneously hydrogen atom, triazone derivatives having the formula,

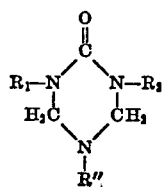

wherein $R_1$ and $R_2$ are as defined above, and $R''$ is a $C_1$–$C_6$ alkyl group or β-hydroxyethyl group, imidazolidone derivatives having the formula,

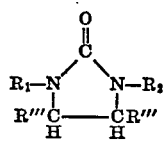

wherein $R_1$ and $R_2$ are as defined above, and $R'''$ is hydrogen atom, hydroxyl group, or a $C_1$–$C_6$ alkoxy group, cyclic urea derivatives having the formula,

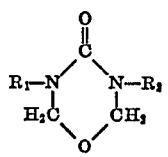

wherein $R_1$ and $R_2$ are as defined above, carbamate derivatives having the formula,

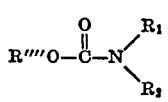

wherein $R_1$ and $R_2$ are as defined above, and $R''''$ is hydrogen atom or a $C_1$–$C_6$ alkyl group, trimethyleneurea derivatives having the formula,

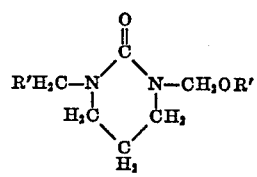

wherein $R'$ is as defined above, and ethylenethiourea derivatives having the formula,

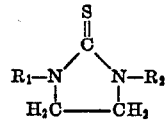

wherein $R_1$ and $R_2$ are as defined above.

2. A method according to claim 1, wherein the aminoplast is a urea derivative having the formula,

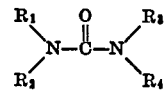

wherein $R_1$, $R_2$, $R_3$ and $R_4$ are as defined in claim 1.

3. A method according to claim 2, wherein $R_1$ and $R_3$ are hydrogen atoms, $R_2$ is —$CH_2OCH_3$ and $R_4$ is —$CH_2OH$, or $R_1$ is —$CH_2OH$ and $R_2$, $R_3$ and $R_4$ are hydrogen atoms.

4. A method according to claim 1, wherein the aminoplast is a cyclic urea derivative having the formula,

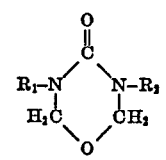

wherein $R_1$ and $_2$ are as defined in claim 1.

5. A method according to claim 4, wherein $R_1$ and $R_2$ are —$CH_2OH$, or $R_1$ is —$CH_2OCH_3$ and $R_2$ is —$CH_2OH$.

6. A method according to claim 1, wherein the aminoplast is used in an amount of 0.005 to 3.0 parts by weight per one part by weight of the crude organic pigment.

7. A method according to claim 1, wherein the grind is conducted at a temperature of 10° to 160° C.

8. A method according to claim 1, wherein the grind is conducted for 0.5 to 30 hours.

9. A method according to claim 1, wherein the inorganic salt is at least one member selected from the group consisting of sodium sulfate, sodium chloride, calcium chloride, calcium carbonate and sodium carbonate.

10. A method according to claim 1, wherein the organic salt is sodium acetate.

11. A method according to claim 1, wherein the additive is selected from the group consisting of water, alcohols, aliphatic hydrocarbons, aliphatic halohydrocarbons, aromatic hydrocarbons and aromatic halohydrocarbons.

12. A method according to claim 1, wherein the organic pigment is a metal phthalocyanine or a metal-free phthalocyanine or a halogen derivative thereof and the additive is selected from perchloroethylene, water and alcohols.

13. A method according to claim 1, wherein the organic pigment is a mixture of a copper phthalocyanine substituted by one or two chlorine atoms, and a chlorine substituted or unsubstituted monosulfo copper phthalocyanine, another or a mixture of said copper phthalocyanine and another metal phthalocyanine, or a mixture of said copper phthalocyanine, said monosulfo copper phthalocyanine and said other metal phthalocyanine, the metal being a member selected from the group consisting of zinc, tin, magnesium, manganese, aluminum, titanium, vanadium, cobalt and iron.

14. A method according to claim 1, wherein the organic pigment is metal-free phthalocyanines, metal phthalocyanines, sulfo-, carboxy-, hydroxymethyl-, nitro-, allyl-, methylol-, aminomethyl-, carbomethyl-, and phospho-substituted derivatives of metal-free or metal phthalocyanines.

15. A method according to claim 1, wherein the organic pigment is azo pigments including azo condensation pigments.

16. A method according to claim 1, wherein the organic pigment is aromatic condensed ring pigments selected from vat pigments, anthraquinone pigments, dioxazine pigments, quinacridone pigments, fluorubine pigments, naphthalene pigments, perylene pigments, isoindolinone pigments, thioindigo pigments, thiachromone pigments, quinophthalone pigments, pyrrocoline pigments and metal complex pigments.

References Cited

UNITED STATES PATENTS

| | | | |
|---|---|---|---|
| 2,723,981 | 11/1955 | Tullsen | 106—288 QX |
| 3,351,481 | 11/1967 | Hopmeier et al. | 106—288 Q |
| 3,310,416 | 3/1967 | Schibler | 106—308 NX |
| 3,549,396 | 12/1970 | Dietz | 106—288 QX |
| 3,642,650 | 2/1970 | McIntosh | 106—309 X |
| 2,982,666 | 5/1961 | Chun et al. | 106—309 X |

FOREIGN PATENTS

| | | | |
|---|---|---|---|
| 879,291 | 10/1961 | Great Britain | 106—288 Q |
| 761,336 | 6/1967 | Canada | 106—309 |

HELEN M. S. SNEED, Primary Examiner

U.S. Cl. X.R.

106—308 N, 309